July 7, 1925.
J. B. LA PIERRE
STEERING WHEEL
Filed Feb. 11, 1925
1,544,658
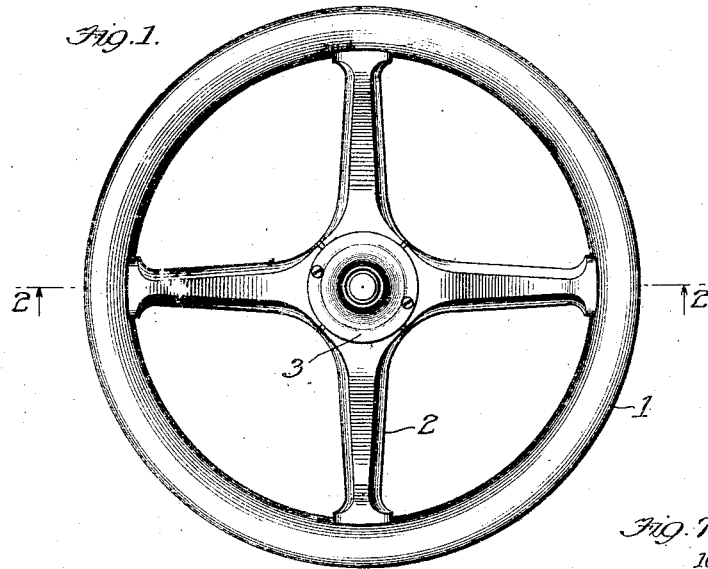
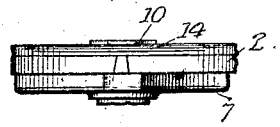
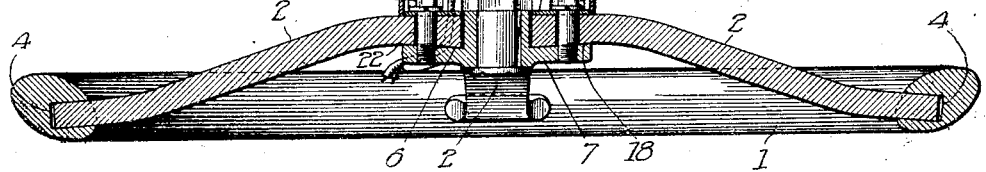
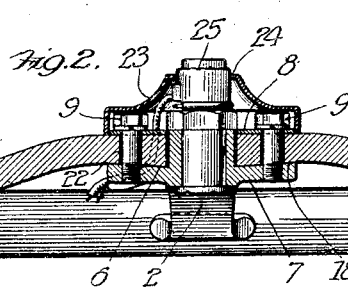
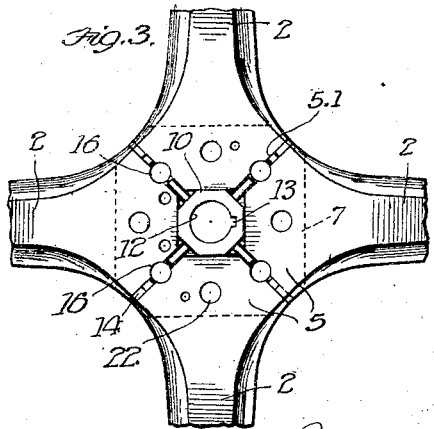
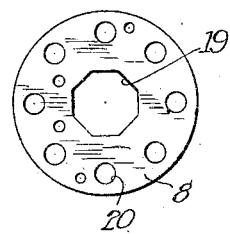
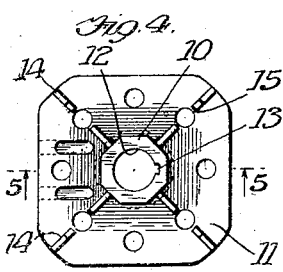
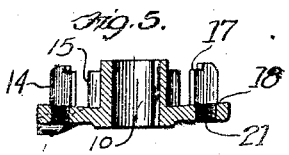

Patented July 7, 1925.

1,544,658

UNITED STATES PATENT OFFICE.

JULIAN B. LA PIERRE, OF CHICAGO, ILLINOIS.

STEERING WHEEL.

Application filed February 11, 1925. Serial No. 8,427.

*To all whom it may concern:*

Be it known that I, JULIAN B. LA PIERRE, a citizen of United States of America, and a resident of Chicago, county of Cook, and State of Illinois, have invented a new and useful Improvement in Steering Wheels, of which the following is a specification.

This invention relates to steering wheels and particularly to the type of steering wheels having wooden spider arms.

In the wooden type of steering wheel heretofore in use, the spider has consisted of a rigid unitary structure having a wooden hub so that in assembling the wheel it has been necessary to cut away a portion of the rim at the points where the spider arms were attached. After the assembly of the rim and spider, the grooves in the rim were then plugged with filler blocks.

In the construction of automobile steering wheels, it is desirable to produce an article which is ornamental in appearance, and it is also necessary that it be of sufficient strength to withstand the strain and abuse to which it is likely to be subjected. It is also desirable that the connections between the spider arms and rim be such that the rim will be free from projections and patching and will present no obstruction to the free sliding movement of the hands around the wheel rim.

The main objects of this invention are to provide a steering wheel having an improved form of hub part adapted to rigidly secure the wooden spider arms together after they have been inserted separately into the rim whereby the rim and spider may be readily assembled without cutting away any part of the rim at the points where the spider arms are attached; to provide a hub of this kind which is especially adapted for use in connection with wooden spider arms having inner ends of polygonal contour; to provide an improved form and arrangement of wings or partitions on the hub for separating the inner extremities of the spider arms; to provide a hub having an improved form and arrangement of cam means adapted to draw the spider arms radially inwardly into close fitting contact with said partitions so as to present a finished appearance to the spider arms at their points of connection with the hub and to produce a rigid structure; and to provide a wooden steering wheel having an improved form and arrangement of parts which may be quickly assembled by even unskilled labor.

An illustrative embodiment of this invention is shown in the accompanying drawing, wherein:—

Fig. 1 is a plan of a steering wheel to which this invention is applied.

Fig. 2 is an enlarged transverse section, taken on the line 2—2 of Fig. 1.

Fig. 3 is a fragmentary plan of the central part of the spider, the cap and top plate of the hub being removed.

Fig. 4 is a top plan of the base part of the hub.

Fig. 5 is a central vertical section of the same, taken on the line 5—5 of Fig. 4.

Fig. 6 is a plan of the top plate of the hub.

Fig. 7 is a fragmentary side elevation of the spider hub.

In the specific construction herein shown, the steering wheel to which this invention is applied comprises an annular wooden rim 1 and a plurality of separate wooden spider arms 2, having their outer ends secured to the rim 1 and their inner ends rigidly secured to a metal hub 3.

In the form shown, the rim 1 is oval in radial cross section, and, arranged at regular intervals in its inner periphery, are recesses 4 in which the outer ends of the spider arms 2 are seated. The spider arms fit snugly in the recesses 4, and, if desired, they may be glued therein. With this improved form of connection between the rim and spider arms, the wheel rim is free from projections and patching and presents no obstructions to the free sliding movement of the driver's hands around the wheel rim.

The spider arms 2 are curved longitudinally, so as to locate the inner ends thereof in a plane offset slightly from the plane of the rim. As shown in Fig. 2, the hub of the spider is located above the plane of the rim, but, if desired, the arms 2 may be curved in the opposite direction so as to position the hub below the plane of the rim. The inner ends of the spider arms 2 are enlarged to provide bearing parts 5 of truncated wedge shape, clamped to the hub 3, and having their inclined extremities 5.1 slightly tapered downwardly, as shown in Fig. 7, to facilitate assembly of the hub and spider arms. The lower faces 6 of the bearing parts 5 are inclined downwardly and outwardly, as shown in Fig. 2, so as to form cam surfaces adapted to coact with corresponding parts of the hub 3, as hereinafter described.

In the form herein shown, the hub 3 comprises coacting parts 7 and 8 adapted to embrace the bearing parts 5 of the spider arms and which are rigidly secured thereto by bolts 9. The hub part 7 comprises a central sleeve 10 of polygonal cross section and a flange or web 11 integrally formed thereon.

The sleeve 10 has a circular bore 12 and the usual keyway 13 adapted to fit the vehicle steering post, not shown. Formed on the upper face of the web 11, are radially disposed wings 14, corresponding in number to the spider arms 2, and arranged to form partitions for separating the edges of each bearing part 5 from those of adjacent spider arms. Openings 15 in the wings 14 permit certain of the bolts 9 to be arranged between the opposed edges 5.1 of the bearing parts 5, which are recessed as shown at 16 to receive the bolts.

As shown in Fig. 7, the wings 14 are also slightly tapered upwardly to correspond to the tapered edges 5.1 of the spider arms 2, so that, after the spider arms have been inserted in the rim 1, the hub part 7 may be readily inserted to wedge the wings 14 into the spaces between the inner ends of the spider arms. The outer edges of the wings 14 are flush with the edges of the bearing faces 5.1 so as to present a finished appearance which may also be greatly enhanced by coloring the exposed edges of the wings 14 to simulate wooden inlays. The upper edges of the wings 14 are recessed, as shown at 17, to receive the hub part 8.

The upper face of the hub part 7 is dished to form cam surfaces 18, which coact with the corresponding cam surfaces 6 of the spider arms 2 for drawing the spider arms radially inwardly, upon the application of pressure to the parts 7 and 8, so as to force the wings 14 and bearing faces 5.1 into abutting relation. For this purpose, pressure may be applied to the hub parts 7 and 8 by any suitable means. If desired, a separate press may be used to force the parts 7 and 8 inwardly before the bolts 9 are inserted.

In the form shown, the hub part 8 is a disk having a polygonal central opening 19, which fits loosely over the sleeve 10, and a plurality of apertures 20 for the bolts 9. The lower ends of the bolts 9 are threaded to engage threaded apertures 21 in the hub flange 11. Certain of the bolts extend through the recesses 16 of the spider arms and the others extend through apertures 22 formed in the bearing parts 5.

Surmounting the clamping ring 8, is a cap 23 having a central opening 24 for the usual bush button 25, which controls the horn or other vehicle signal.

To assemble a steering wheel embodying this invention, glue is applied to the recesses 4 and the outer ends of the spider arms 2, and the arms are then individually inserted into the rim 1. The ample space provided between the inner ends of the spider arms permits the last arm to be readily inserted into the rim without springing or distorting the arms. This feature of applicant's invention permits the assembly of a wheel with a considerable saving of time over that required in the assembly of a wheel having a spider of unitary structure. After the spider arms have been inserted into the rim, the hub part 7 is inserted to wedge the wings 14 between the bearing faces 5.1. The clamping ring 8 is then placed on top of the bearing parts 5 and pressure applied to the parts 7 and 8 so as to force the bearing faces 5.1 firmly against the wings 14. The desired pressure may be obtained, if desired, in tightening up on the bolts 9, and for this reason the apertures 22 and recesses 16 are sufficiently large to permit some radial adjustment of the spider arms 2. The desired inward movement of the arms 2 may be facilitated by the application of some semi-liquid substances, such as glue or shellac, to the cam faces 6 and 18.

Although but one specific embodiment of this invention has been herein shown and described, it will be understood that numerous details of the construction shown may be altered or omitted without departing from the spirit of this invention, as defined by the following claims:—

I claim:

1. In a steering wheel, the combination with a rim having a plurality of recesses in the inner edge thereof, a plurality of spider arms having their outer ends seated in said recesses, of a hub comprising coacting parts adapted to embrace the inner ends of said spider arms to secure said arms against withdrawal from said recesses, one of said parts having a cam surface coacting with said spider arms and arranged to draw said arms radially inwardly upon the application of pressure to said parts.

2. In a steering wheel, the combination with a rim having a plurality of recesses in the inner edge thereof, a plurality of spider arms having their outer ends seated in said recesses, of a hub comprising coacting parts adapted to embrace the inner ends of said spider arms to secure said arms against withdrawal from said recesses, said arms and one of said parts having abutting shoulders, and means arranged to draw said arms radially inwardly to bring said shoulders into close fitting relation.

3. In a steering wheel, the combination with a rim having a plurality of recesses in the inner edge thereof, a plurality of spider arms having their outer ends seated in said recesses, of a hub comprising coacting parts adapted to embrace the inner ends of said spider arms, radially disposed wings on one of said parts, and means arranged to draw said spider arms radially inwardly to bring the inner extremities thereof into abutting relation to said wings.

4. In a steering wheel, the combination with a rim having a plurality of recesses in the inner edge thereof, a plurality of spider arms having their outer ends seated in said recesses, of a hub comprising coacting parts adapted to embrace the inner ends of said spider arms, and radially disposed wings on one of said parts arranged to abut against the inner extremities of said arms, said spider arms and one part having coacting cam surfaces arranged to force said arms radially inwardly into close fitting relation to said wings upon the application of pressure to said hub parts.

5. In a steering wheel, the combination with a rim having a plurality of recesses in the inner edge thereof, a plurality of spider arms having their outer ends seated in said recesses, of a hub comprising coacting parts adapted to embrace the inner ends of said spider arms, radially disposed wings on one of said parts arranged to form partitions adapted to separate the inner extremities of each spider arm from those of an adjacent arm, and means for clamping said hub parts together.

6. In a steering wheel, the combination with a wooden rim, a plurality of wooden spider arms having their outer ends secured to said rim, of a metal hub comprising coacting parts adapted to embrace the inner ends of said spider arms, radially disposed wings on one of said parts arranged to form partitions for separating the inner extremities of each spider arm from those of adjacent arms, and clamping means extending through said arms for securing said hub parts thereto.

7. In a steering wheel, the combination with a rim, a plurality of spider arms having their outer ends secured to said rim, the inner extremities of said arms being of truncated wedge form, of a hub comprising coacting parts adapted to embrace the inner ends of said arms, radially disposed wings on one of said parts arranged to form partitions for separating the inner extremities of one arm from those of adjacent arms, and means for clamping said arms to said hub parts.

8. In a steering wheel, the combination with a rim, a plurality of spider arms having their outer ends secured to said rim, the inner extremities of said arms being of truncated wedge form, of a hub comprising coacting parts adapted to embrace the inner ends of said arms, radially disposed wings on one of said parts arranged to form partitions for separating the inner extremities of one arm from those of adjacent arms, said one part and spider arms having coacting cam surfaces arranged to draw said arms radially inwardly to bring said inner extremities into close fitting relation to said wings, and bolts extending through said arms for clamping said hub parts thereto.

9. A steering wheel comprising a wooden rim, wooden spider arms having their outer ends secured thereto, the inner ends of said arms being of truncated wedge form, a metal hub having a sleeve of polygonal cross-section, a flange on said sleeve adapted to support the inner ends of said arms, radially disposed wings on said flange adapted to abut against the inner extremities of said arms, a clamping ring arranged in opposed relation to said flange, and means for clamping said spider arms to said ring and flange, said flange and spider arms having coacting inclined surfaces arranged to draw said arms radially inwardly to force said inner extremities into close contact with said partitions upon the application of pressure to said ring and flange.

Signed at Chicago this 3rd day of February 1925.

JULIAN B. LA PIERRE.